US010561947B1

(12) United States Patent
Johnston (10) Patent No.: US 10,561,947 B1
(45) Date of Patent: Feb. 18, 2020

(54) ONLINE TRIVIA GAME SYSTEM

(71) Applicant: Defying Gravity LLC, Newport, KY (US)

(72) Inventor: Adam Johnston, Newport, KY (US)

(73) Assignee: Defying Gravity LLC, Newport (*) Notice: Subject to any disclaimer, the term of this patent is extended or adjusted under 35 U.S.C. 154(b) by 6 days.

(21) Appl. No.: 15/915,190

(22) Filed: Mar. 8, 2018

Related U.S. Application Data

(60) Provisional application No. 62/522,089, filed on Jun. 20, 2017, provisional application No. 62/477,843, filed on Mar. 28, 2017.

(51) Int. Cl.
| | | |
|---|---|---|
| A63F 13/80 | (2014.01) |
| A63F 9/18 | (2006.01) |
| A63F 13/795 | (2014.01) |
| A63F 13/798 | (2014.01) |
| A63F 13/35 | (2014.01) |
| A63F 13/61 | (2014.01) |
| A63F 13/70 | (2014.01) |
| A63F 13/46 | (2014.01) |
| A63F 13/26 | (2014.01) |

(52) U.S. Cl.
CPC .............. *A63F 13/80* (2014.09); *A63F 9/183* (2013.01); *A63F 13/26* (2014.09); *A63F 13/35* (2014.09); *A63F 13/46* (2014.09); *A63F 13/61* (2014.09); *A63F 13/70* (2014.09); *A63F 13/795* (2014.09); *A63F 13/798* (2014.09); *A63F 2300/8064* (2013.01)

(58) Field of Classification Search
None
See application file for complete search history.

(56) References Cited

U.S. PATENT DOCUMENTS

| | | | | |
|---|---|---|---|---|
| 8,684,807 B1 * | 4/2014 | Crici | .................. | A63F 13/92 434/322 |
| 2008/0146340 A1 * | 6/2008 | Ami | .................. | G06Q 90/00 463/42 |
| 2013/0116044 A1 * | 5/2013 | Schwartz | ............... | A63F 13/12 463/29 |
| 2015/0251098 A1 * | 9/2015 | Schwartz | ............... | A63F 13/12 463/9 |

* cited by examiner

*Primary Examiner* — Ronald Laneau
(74) *Attorney, Agent, or Firm* — Jenei LLC (57) ABSTRACT

An online trivia game system is provided, and more particularly systems and methods of providing a trivia game system for end-users to construct trivia games using an online database of trivia questions and answers in order to host live on-site trivia games.

21 Claims, 6 Drawing Sheets

ONLINE TRIVIA GAME SYSTEM

CROSS-REFERENCE TO RELATED APPLICATIONS

This application claims the benefit of U.S. Provisional Application Ser. No. 62/477,843 entitled "ONLINE TRIVIA GAME SYSTEM" filed Mar. 28, 2017, and to U.S. Provisional Application Ser. No. 62/522,089 entitled "ONLINE TRIVIA GAME SYSTEM" filed Jun. 20, 2017, both of which are hereby expressly incorporated by reference herein to form part of the present disclosure.

BACKGROUND OF THE INVENTION

1. Field of the Invention

The field of art disclosed herein pertains to an online trivia game system, and more particularly to systems and methods of providing a trivia game system for end-users to construct trivia games using an online database of trivia questions and answers in order to host live on-site trivia games.

2. Description of the Related Art

In the classic multiplayer trivia game, players join a trivia game and play against the clock to try to beat other players to the right answers. In general, the player who answers all questions correctly first wins the prize or points. Other games may offer the prize to the player with the highest number of correct answers, or split the prizes between the first few players, or roll it over to the next tournament if no player answers correctly.

In general, previous systems provide for Trivia Nights as a complete show, which are delivered by to the host user. The client/host user has no flexibility over the questions received. In addition, previous systems have not provided for training materials.

SUMMARY OF THE INVENTION

In one aspect, the present disclosure provides a method of constructing and implementing a trivia night game. In one or more embodiments, the method includes: (i) authorizing, by an application executed by a host user device, a new trivia night game with a trivia night service accessed over a network; (ii) constructing a set of trivia questions by a selected one receiving user input questions and receiving user selections of remotely provided questions; (iii) linking to at least one of a display monitor and at least one user device of a player of the trivia night game; (iv) presenting the set of trivia questions via the linked at least one of a display monitor and the user device; and (v) tracking user scores on the host user device. In another aspect, the present disclosure provides that once a host user builds a trivia night game, the system of the present invention may show instructions on how to host the trivia game including hosting tips, how to find a host, how to pick a night for a game, how to set up equipment for a game, getting started and how to improve the host's game night.

In another aspect, the present disclosure provides a system that includes a trivia night builder service that contains network repository of trivia questions. A network is in communication with the trivia night service. An electronic device of one or more electronic devices includes: (a) a network interface that communicates with the trivia night service via the network; (b) a user interface device; and (c) a processor subsystem in communication with the interface and the user interface device, and which executes a trivia night application. The trivia night application: (i) authorizes a new trivia night game builder with the trivia night service accessed over the network; (ii) constructs a set of trivia questions by a selected one receiving user input questions and receiving user selections of remotely provided questions; (iii) links to at least one of a display monitor and at least one user device of a player of the trivia night game; and (iv) presents the set of trivia questions via the linked at least one of a display monitor and the user device.

In an additional aspect, the present disclosure provides a computer-readable storage medium comprising computer-executable instructions. When executed via a processing unit on a computer, the instructions perform acts including: (i) authorizing, by an application executed by a host user device, a new trivia night game with a trivia night service accessed over a network; (ii) constructing a set of trivia questions by a selected one receiving user input questions and receiving user selections of remotely provided questions; (iii) linking to at least one of a display monitor and at least one user device of a player of the trivia night game; (iv) presenting the set of trivia questions via the linked at least one of a display monitor and the user device; and (v) tracking user scores on the host user device.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The present innovation relates generally to an online trivia game system, and more particularly to systems and methods of providing a trivia game building system for host end-users (clients) to construct trivia games using an online database of trivia questions and answers in order to host live on-site trivia games. The present system provides host clients/host users the ability to create their own shows based on categories, keywords, difficulty levels, etc., all on their own time.

The design of the invention can take on any number of configurations, depending on the intended use of the system. All configurations of the trivia game building system have at least the following components: (a) an online host user enrollment system; (b) a networked online database of curated trivia questions and answers; (c) a host user selectable trivia game show builder; and a host user-selectable output of trivia game show questions and answers. The "host user" or "client", as used herein means a user of the networked trivia game show builder.

In one aspect, the present disclosure provides a variety of trivia games, wherein the rules vary, for example, by number of participants, topics of trivia questions, winning payouts and other pre-selected criteria.

In one embodiment, the present invention provides for an online database of trivia game questions and answers for compiling a segment of the questions and answers in a networked database of thousands of questions or by submitting their own questions. In one embodiment, the winner is the fastest player to answer correctly or the player with the most number of corrected answers depending on the type of game.

In one embodiment, the game materials are compiled in a networked website of the present invention and there is no need to download any software to the players' personal computers.

In another aspect, the present disclosure provides for an online subscription model. The subscription fee may have one or more tiers, each tier offering a different level of service. In one or more embodiments, which utilize subscriptions, those subscriptions may be tiered, such that lower-tiered subscriptions have more restrictions and/or less access to features of the online platform than higher-tiered subscriptions. Subscription statuses may be incomplete, pre-registered, registered, subscribed, expired, closed, flagged and/or others. In one embodiment, the subscription account type may be altered at any time.

In one embodiment, host users pay a monthly fee to be given the ability to create one or more trivia shows over a predetermined time period in that month. If the host user does not create one or more allotted shows, the allotment rolls over into the following time period. For example, if the host user is allotted one show per week and does not create a show during a given week, then the host user would be able to create two shows that following week.

In some embodiments, the present disclosure provides for monthly subscription-based access to the trivia game-creating environment. In some embodiments, the present disclosure provides for weekly, quarterly, or yearly subscription-based access to the trivia game-creating environment.

In another embodiment, host users can pay a monthly subscription fee to be able to make more than one show per week, although they won't be able to finalize more than a certain number of shows in a month.

In one or more additional embodiments, the present disclosure provides for an online model with a demonstration or demo mode. In one embodiment, users are able to access an online portion that allows viewing a demonstration of the system. In one or more additional embodiments, the user selects a training module to learn how to use the system to create trivia games. The training content may be any content that aids the user in using the system. In certain embodiments, the training module may contain video demonstrations, written instructions, simulations, mock games, and lists of common questions and answers. In one or more additional embodiments, the user selects the training content for viewing and the training module presents the selected training content to the user. After viewing the training content, the user can choose to pay a fee to be given the ability to create one or more trivia shows over a predetermined time period.

In one or more additional embodiments, the present disclosure provides for an online model that may be configured to provide host users or members with a free trial subscription. With a free trial subscription, a trial user may be allowed to utilize registered user-only features of the web application for free for a predetermined time period (e.g., thirty days) or for a predetermined number of shows created. The trial user may be required to provide payment information (e.g., credit card information), which will be utilized to automatically bill the trial user if the trial user fails to cancel his or her subscription following the predetermined time period or number of uses.

In general, users are able to start building shows at any time in the Show Builder and can save their work to be edited later. When the host user clicks to finalize the show, though, the system puts the saved show output into a transportable or downloadable format such as PDF document format for them to use. In one embodiment, each FLEX subscription is only meant for one venue to host one Trivia Night per week giving each user a set number of shows each month.

In one embodiment, the shows for each user are capped at a set number of finalized shows per month. In one embodiment, the host user clients' accounts lock up if they finalize more than a set number of shows such as 3, 5, 10, 15, or 20 shows.

In another embodiment, the system provides for an expert auto-build formula. In one embodiment, a host user is in the Show Builder and presses the 'Auto Build' button, wherein the system utilizes a pre-programmed formula that puts random trivia questions into the show automatically based on pre-selected levels of difficulty and selection of categories. In another embodiment, the system provides for an expert auto-build formula that can fill in a partial game.

In another embodiment, the system provides for a programmed auto-build formula wherein the system is used to auto-complete the trivia game after a user has partially selected some questions but less than 100%.

In another embodiment, the system provides for a Show Builder module that is a drag & drop system. The host user inputs selection criteria and pulls up a list of questions that are possible based on the selected criteria. The host user can then drag and drop from the list of possible questions to create/build one or more trivia night games. For example, a game may consist of 6 rounds of 3 questions each for 18 questions. In one or more embodiments, the game may include numerical answer questions such as a question that is not generally known such that the answer is a best guess or "shot in the dark" answer. In one or more embodiments, the game may include halftime and final round questions. User could set own game but here, user constrained so that all trivia nights are consistent and maintains reputation.

In another embodiment, the system provides for the questions to be tagged with indicators such as the question type. In one or more embodiments, the questions may be tagged as (a) standard questions, (b) numerical (shot in the dark), (c) halftime and (d) final.

In another embodiment, the rules for building a game by the Show Builder can include one or more limitations selected from: category, difficulty, theme, number of answers or points, etc.

In another embodiment, the system provides for Half Time questions, which have two or more answers such as 2, 3, 4, 5, 6 or more answers. In one or more embodiments, the game may include wagering of points, for example wagering of 0-15 points.

In another embodiment, the system provides for Final questions. In one or more embodiments, the Final is a multi-part question and the participant user has to get all parts correct in order to get the points such that if any part is incorrect, the participant user gets 0 points. In another embodiment, the participant user gets the number of points wagered. In another embodiment, the participant user will see the question before wagering.

In one or more embodiments, the game created by the Show Builder provides for wagering of points for standard questions. In another embodiment, the game can provide for wagering of variable number of points. In another embodiment, the game can provide for wagering of 1, 4 or 6 points or 2, 5, or 7 points wherein the one or more participant users can select which wager amount to use for each question. In another embodiment, the one or more participant user can select which wager amount but the wager amount cannot repeat. For example, in a given round of questions, there may be 3, 4, 5, 6, 7, 8, 9, 10 or more questions and the one or more participant user may select from wagering options such as 1, 4 or 6 points. In one embodiment once the participant user has used the "4 point" wager, that wager cannot be played again in that round. In play, person gets question; answers, and then picks wager.

In one or more embodiments, the game created by the Show Builder provides for wherein the participant user cannot repeat a set category more than once in a game. In one or more embodiments, the game created by the Show Builder provides for the elimination of one or more categories. In one or more embodiments, the game created by the Show Builder provides for weighted question selection such that the level of difficulty is adjusted according to the selection of the host user.

In one or more embodiments, the game created by the Show Builder provides for templates for auto-building a trivia show game. In one or more embodiments, the game created by the Show Builder provides for templates for creating a pre-selected perfect show. In one or more embodiments, the game created by the Show Builder provides for using multiple templates that pre-selected such that the host user gets a different show each time. For example, multiple shows can be created by a single host user but each show is created from a selection of different template so that so that the same type of question (such as a sports question) is not is the same questions slot (e.g., in slot #2) every time.

In one or more embodiments, the game created by the Show Builder provides for selected parameters for adding rules for the host users auto-build feature.

In one or more embodiments, the game created by the Show Builder provides for templates for one or more pre-designed shows. In one or more embodiments, the game created by the Show Builder provides for pre-selected questions can be tagged for creating shows wherein the question set are all designed with a common theme or trait. For example, in one embodiment, a template is created so that a "Harry Potter" themed show is created and the Show Builder is set up to have only Harry Potter themed questions.

In one or more embodiments, the host user can use a downloadable app that allows the host to follow the game/score answers.

In one or more embodiments, the methods and systems provided by the present invention provide for one or more of the following benefits:

Easy Trivia Night Show Creation—(1) the host user selects a person to host the Trivia Night show; (2) the host user creates the Trivia Night Show using the online show creator connected to a question and answer database comprising multiple questions from multiple categories with the flexibility to choose each trivia question in your show based on category, keyword, or difficulty level; (3) the Trivia Night Show created is downloaded onto a host device or printed; and (4) the Trivia Night Show created is used for a live Trivia Night Show hosted at the host user's venue.

Curated Questions—Trivia experts are able to work diligently to write and curate questions that are interesting, well-worded, current, and checked for accuracy with updates to questions added frequently.

Flexibility—Previously, host users have not been able to select the questions/categories to fit the demographics of their show. It is not possible for a Trivia Night company to hand-pick questions for each client.

Choose your own host. If a host user hires a company to service their on-site Trivia Night, the host user is stuck with the person the company sends in to host the show. The FLEX system of the present invention provides for systems and methods that allow the host user to choose its own presenter/host.

Solid game format and training materials for host users who want to host their own Trivia Night. The FLEX system of the present invention provides for systems and methods that is the first product that gives a user everything it needs so it doesn't have to create it from scratch. In one embodiment, the system and methods provide the host user with downloadable game rules, promotional materials and other helpful documents to help make a Trivia Show a success including one or more of a Host Checklist, Training Manual, Game Sheet, Answer Slip Sheet, and Score Sheet.

Affordability—Many host users cannot afford a full-service Trivia Company. The FLEX system of the present invention provides for systems and methods that are affordable for user-enabled trivia nights.

Saves Time—Generally, host users do not have time to find Trivia questions each week that are accurate, fun, relevant, not too easy, not too hard, etc. In the present system, FLEX clients can create the perfect show in one click of a button. The FLEX system of the present invention provides for systems and methods wherein the online database of questions and answers is curated such that the accuracy and relevancy has been predetermined.

Used Questions—It is difficult for users to remember which questions they have or have not used in past shows. In one or more embodiments, the system takes care of all of this in its Show Builder by keeping a continuously updated record of questions used in past shows for a particular host user and marking them such that they are not re-used.

Nationwide—The FLEX system of the present invention provides for systems and methods that give any host user in any geographical locale the ability to host a top-notch Trivia Night. Many users struggle with putting together a Trivia Night because they are located in an area without access to full service Trivia Night companies.

Subscriptions—the FLEX system of the present invention provides for systems and methods that give any host user the ability to purchase Trivia Night Show based on a subscription model that provides for a determined number of allowed Trivia Night Shows per given time period.

In one embodiment, the systems and methods of the present invention provide for a networked online database of curated trivia questions and answers that are tagged by one or more keyword, term or tag elements selected from categories, keywords, difficulty levels, topics, source, geography and region; education level; etc., which can be arranged in any order chosen.

In some embodiments, one or more areas of skill, interest, or expertise are selected from subjects including, by way of non-limiting examples, language arts, mathematics, social studies, science, music and other performing arts, visual arts, additional languages, health, fitness and sports, and information technology. In further embodiments, the subjects include one or more higher education topics including, by way of non-limiting examples, U.S. history, U.S. government, world history, European history, economics, macroeconomics, microeconomics, psychology, sociology, anthropology, philosophy, law, political science, education, urban studies, women's studies, biology, botany, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, algebra, statistics, geometry, calculus, trigonometry, electrical engineering, civil engineering, mechanical engineering, chemical engineering, writing, American literature, European literature, English literature, world literature, composition, poetry, music theory, religion, drawing, painting, photography, film, theatre, journalism, computer science, computer programming, business, business administration, accounting, nursing, law enforcement, physical education, and sign language.

In one embodiment, the systems and methods of the present invention provide for a networked online database of curated trivia questions and answers that are used to create a Trivia Night show for the host user. In one embodiment, the Trivia Night show is hosted at a venue selected by the host user wherein participant users (contestants) can answer questions.

Participant users or contestants include any person who participates in a trivia game. Contestants may include an audience member. A Trivia Question includes a question and may include corresponding answer or answers with one of the answers being flagged as a correct answer. A Trivia Answer includes an answer to a trivia question. A Trivia Match includes any live trivia match or game where at least two participant users participate as contestants. Trivia Match Round includes at least one question being asked by a questioning host and being answered by a contestant. Contestant Team includes groups of two more contestants who participate as a team. Team Match includes a trivia game where contestants compete in teams of two or more. The audience members and the contestants can pay or be paid to participate in a trivia match. According to some embodiments, the game may include team matches. Teams may be assembled using any means. In some embodiments, contestants and audience members may have access to a database such as a wiki (e.g. Wikipedia) or other online or offline information repository that they can use to research the answer to a question before submitting a selected answer or vote.

Exemplary Programs that may or may not be hosted on a central server, include a Trivia Show Builder Program. Exemplary databases, which also may or may not be hosted on a central server include an End User Database and Question Database. An End User Database may associate or have access to data such as: (a). ID; (b). Personal Info; (c). Billing Information; and (d). Subscription Limitations. A Question Database may associate or have access to data such as: (a). ID; (b). Question; (c). Answer; and (d). Correct Answer(s).

In one embodiment, the venue is a bar, restaurant, theater, business, home or other venue. In one embodiment, the host user uses the Trivia Night show as a one-time or recurring event at the host user's venue in order to stimulate business and attract customers. In one embodiment, the host user customizes the Trivia Night show questions by filtering questions according to one or more user-selectable filters such as category, keyword, demographics and difficulty level.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s), which access data in the database.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred. Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

In one embodiment, the systems and methods of the present invention provide for a networked, online Show Builder, which allows host users to create a trivia show with one click whereby a Show Builder randomly arranges trivia questions.

In one embodiment, the system gives host users the option to substitute trivia questions in and out of the randomly generated show.

In one embodiment, the systems and methods of the present invention provide for an online Show Builder that selects from questions and answers that have not yet been used in a finalized show previously created by that host user.

In one embodiment, the system provides for an Auto Build button in the Show Builder which, when selected, fills all empty slots with a Trivia question based on pre-determined formula(s) (one or more rules written into the software that prevent problems from occurring in randomly generated shows, such as too many difficult questions in the same round or too many of the same category in one show).

In one embodiment, the host user can start building a custom show and then hit the Auto Build button to fill in the rest. In another embodiment, the host user can Auto Build a show and then go through and swap out individual questions. In one embodiment, the Show Builder remembers all the questions you finalize so you never see repeats. In another embodiment, each question in the online database also has a "Changeability" tag, which alerts our question writers of potential conflicts with questions. For example, if a question is a sports question about the World Series, each October the question needs to be checked to make sure the current World Series did not alter the accuracy of the question. In one embodiment, the system periodically checks questions marked with the Changeability tag.

In one embodiment, the system provides for training to host users to learn how to properly and effectively host a Trivia Night. In one embodiment, the system provides score sheets (such as an app or a spreadsheet) to host users so they do not have to manually add scores during the hosted trivia game.

In one embodiment, the system provides for at least one Bonus question called Shot In The Dark wherein trivia night teams have to guess a numerically-based question (the answer is a random number) such that the top 50% of teams closest to the correct answer get one Bonus point. This Shot In The Dark question allows the end-participant user (trivia game participant to the hosted trivia game) to go a step further and award a round of prizes such as beers or an appetizer (local laws apply) to the team that guesses closest to the correct answer.

In one embodiment, the system provides for software that turns a host user's finalized Trivia show into an electronic presentation (e.g., PowerPoint) or other media through the website that can be then be displayed on displays at the host user's venue.

In another embodiment, the system provides for software wherein host users can display videos, advertisements and other media as well as trivia questions on displays throughout the host user's on-site location.

In another embodiment, the system provides for an app for users to utilize the Trivia Night Show to create a network wherein they can send push notifications out to host users customers and participants.

In another embodiment, the system provides for app development for users to build their own apps to provide "gamification" for their apps by incorporating the game builder system.

In another embodiment, the system provides for an app for use as an output device for the game content and may provide host users with a proprietary trivia game.

In another embodiment, the system provides for a referral program wherein host users can earn discounts/swag/etc. for giving referrals to new host users.

In another embodiment, the system provides for a coupon system so sales people (such as distributor representatives) can sell memberships to the FLEX system of the present invention and receive a commission if a new client/host user signs on.

In another embodiment, the system provides for Private/Corporate Events and may be delivered in a plurality of locations.

In another embodiment, the system provides for an app for host users to be able to host the entire show (read Trivia questions, keep score, play music, etc.) from their phone, tablet, or laptop.

In another embodiment, the system provides for methods that allow host users to add/manage the listing for their own Trivia Night on the system website creating the only place that lists all Trivia Nights across America, no matter who hosts the Trivia Night.

In another embodiment, the system provides for methods of allowing host users to favorite Trivia questions so that they trend and others can follow trending questions.

In another embodiment, the system provides for pre-made shows (e.g., theme shows like movie characters or easier/approachable shows for clients just starting to build their Trivia Night) that have been approved by the system.

In another embodiment, the system provides for a program where companies can get free Trivia shows for their corporate event in exchange for promotion or introductions to local venues.

In another embodiment, the system provides for advertising wherein the system allows brands to pay to "feature" Trivia questions about them to host users in the Show Builder.

In another embodiment, the system provides for adding additional adjunct features through partnering with companies in order to offer users a variety of services (valet service, party planning, promo girls, secret shopping).

In another embodiment, the system provides for a game or product for families who are on a wait at a restaurant. In another embodiment, the system provides for scratch off tickets where the participant user has to have only the correct answer scratched off to win the prize, which are coupons tailored to the host user/client preferences.

In another embodiment, the system provides for board games and/or card games wherein the host user can output the trivia game to tangible formats.

In another embodiment, the system provides for a National Championship or regional tournaments or a Trivia Convention.

In another embodiment, the system provides for software for tablets or small screens to provide entertainment in bathrooms.

In another embodiment, the system provides for online sale of beverages, such as liquor or beer, which can then be set for delivery.

In the trivia based game of the present embodiment, the host user connects with the server. The host user may either connect to the server via a webpage or the client software. After the client software is verified as correct and up-to-date, the host user is given the option of either creating a new account or logging into an existing account. If the host user chooses to create a new account, the host user is prompted with the new account creation process. Finally, the host user is presented with the lobby menu.

In the trivia based game builder system of the present embodiment, the host user connects with the server to the lobby menu of the present embodiment. The lobby menu provides several sub-menus to the host user, such as: options, exit, trivia creation lobby, help and payment. The exit option allows the host user to logout out of the server and disconnects the client software from the server. The trivia show builder lobby is the main area for host users to choose which trivia games they want to create. Within the trivia show builder lobby, the host user has several sub-menus and options. The search questions option provides the host user the ability to search for questions available for a new game or for a game currently in progress of being built. The Question Difficulty option allows a host user to select the difficulty level of the questions available to select for game creation from easy to difficult. The Categories option allows a host user to select one or more categories of the questions available to select for game creation such as Animals, History, Movies, People, Science or Sports. The Halftime option allows a host user to select one or more questions for game creation for use as a special halftime feature. The Shot in the Dark/Tiebreaker option allows a host user to select one or more questions of the questions available to select for game creation for use as special events during a trivia show. The Final option allows a host user to select one or more questions of the questions available to select for game creation for use as special final question during a trivia show. The Get More Questions option allows a host user to select one or more additional questions of the questions available to select for game creation. The Auto Generate Show option allows a host user to automatically fill in any empty question spots. The Save Draft option allows a host user to save the quiz progress without finalizing. The Finalize option allows a host user to finish the quiz, so that it can be printed and distributed. In one embodiment, the quiz will not be editable after it's finalized.

In one or more exemplary methods, a Trivia Night show is prepared by the host user (client of the trivia game building system) by following the steps of:

1-Find someone to live host the weekly Trivia Night (if you do not already have someone) and make sure that this person is available to host on the night you are wanting to have your Trivia Night.

2-Once you select your start date, you need to get people hearing about your upcoming Trivia Night. This is accomplished mainly by putting up promotional materials around a venue and including Last Call Trivia in current advertising channels (local papers, radio, TV, websites, social media, etc.), as well as informing staff so that they can be marketing an upcoming Trivia Night.

3-A host user will need sound equipment for the show so that the game host can read the trivia questions aloud to the teams playing and then play music in-between each trivia question. The person hired may already have sound equipment that he/she is willing to use.

4-Create the first trivia show. Click the 'Add a New Show' button in your Dashboard and follow the instructions. When you get to the Show Builder, find whatever trivia questions you want from the left side and drag them over to the blue slots on the right side, or simply press the 'Auto Generate Show' button at the top to create your trivia show using a random selection of unused trivia questions that were put in order based on our secret expert formula. You can save your work at any time, and when you're show is just the way you want it, press the 'Finalize' button to print or email your trivia show.

5-Decide what prizes you want to offer to the top-placing teams at your Trivia Night. In one embodiment, the prize is a $30 gift card for 1st place, a $20 gift card for 2nd place, and a $10 gift card for 3rd place, but the more successful venues give out $50, $25, and $10 (which, again, is a reason why they become successful). Giving away gift cards (valid beginning the following day) to your establishment as prizes ensures that the teams will come back, plus it's a way to give a little something to everyone on the team. You don't have to give gift cards/bar cash as prizes, but remember that you get what you give. You also need to decide if you are going to offer a prize on the Shot In The Dark question. This bonus question was specifically designed for two reasons—to give players a different type of trivia question (guessing close to a difficult numerical answer) and to give venues the ability to award the team closest to the correct answer. Most venues give out a free round of cheap house shots (where legal) to the team that gets closest to the correct answer on this question, but other venues have found that a round of draft beers or an appetizer for the table work well too.

6-Prepare for your next show by printing off game sheets, cutting and assembling answer pads, gathering pens, and arranging prizes.

In one or more embodiments, one or more of the following equipment items are used:

Public Address (PA) System—Either you or the venue will have an audio system to use during the show. Learn and follow the guidelines established by the manufacturer(s) of the equipment for proper use, and use only that equipment.

Music Source—In one or more embodiments, a music source such as an mp3 player, laptop, CD player, or other approved electronic device is used to play music during the show. Music should be chosen to compliment the demographics of the venue. Check with the venue for guidelines on specific music, especially music containing profanity or potentially offensive material. In addition to providing entertainment and acting as a timer to turn in answers, the music also creates a certain noise level so that team members don't have to whisper to each other (because of other teams sitting nearby).

Patch Cord—In one or more embodiments, a patch cord is used, this is a small cord connects the music source to the audio system so that the music can be projected through the speakers.

In one or more embodiments, one or more of the following materials are used:

Game Sheet—In one or more embodiments, this document is used to help each team understand the rules, follow the game, and keep score. Make sure you have enough available so that each team that shows up to play has one. The teams may keep their own game sheet (they do not have to turn it in) and use it for whatever they want—writing down the questions/answers, keeping score to compare with host's recorded score, etc.

Answer Slips—In one or more embodiments, each team receives a group of answer slips—one for each question in the show—relatively the size of a business card. You will either need to print off, cut, and assemble these prior to each show, or they can be purchased as pre-made answer pads from the Last Call Trivia website. For each question, the teams will record their answer(s), team name, and point wager on one of the answer slips and bring it up to you for scoring. As teams turn in answers to you, make sure you keep all of the answer slips in a neat pile so that you can easily find an answer in case of a dispute.

Pens/Pencils—In one or more embodiments, pens, pencils or other writing instruments are provided so that each team can record their answers on the answer slips and follow along on the game sheet. An app may also be used to record results.

Show—In one or more embodiments, this document contains the all the questions/answers necessary for you to host the trivia show. The questions are in black and the answers are just below the questions in red. The show comes with one or more of the tie Breaker question and extra questions. The Tie Breaker should be used at the conclusion of the show if there are any tied scores after the final question or in the event that there is a problem with the Shot In The Dark and you need a replacement (that is, if someone were to cheat). The extra questions are available to swap out with other regular questions for a few reasons: someone yelling out an answer, a potentially incorrect question/ answer, etc. You will also notice a final question sheet attached to the end of the show document. Enough of these final question sheets should be printed and cut to accommodate more than the number of teams you are expecting. Final question sheets are important to the teams because they eliminate any possible confusion on a complex question that is a determining factor in the final scores/standings.

Score Sheet—In one or more embodiments, this document is used to keep score during the show. As you go to the right of the box where the team name is written on the Paper Score Sheet, you will notice each row has a light half and a dark half, which are explained below. The light half (upper) is where the team's point wager for each question is recorded. By writing down all the point wagers, it allows you to check whether each team has used a valid wager. In other words, since each of the three wagers must be used in a round, you can make sure teams are not duplicating point wagers during the same round by writing each wager down. If the team answers the question correctly, leave the point wager as is. If the team answers the question incorrectly, lightly cross out the point wager. Put a "2" in the box for each team that earns points on the Shot In The Dark question, and a "0" in the box for each team that does not earn points on the Shot In The Dark question. For the halftime and final questions, write the number of points scored by each team in the corresponding box—ranging from 0 to 8 points for the halftime question and −15 to 15 for the final question. There are three columns labeled "Place" on the Score Sheet where you can rank all the teams according to their current total score (halftime, before final question, and end of game). The dark half (lower) is where you keep track of each team's total points throughout the game by adding the score from a question to the game total score up through the previous question.

Prizes—In one or more embodiments, the venue will have prizes (usually gift certificates or bar tabs) for the winning teams, which you need to have ready before the conclusion of the show so that the winning teams do not have to wait around.

Figure 1:
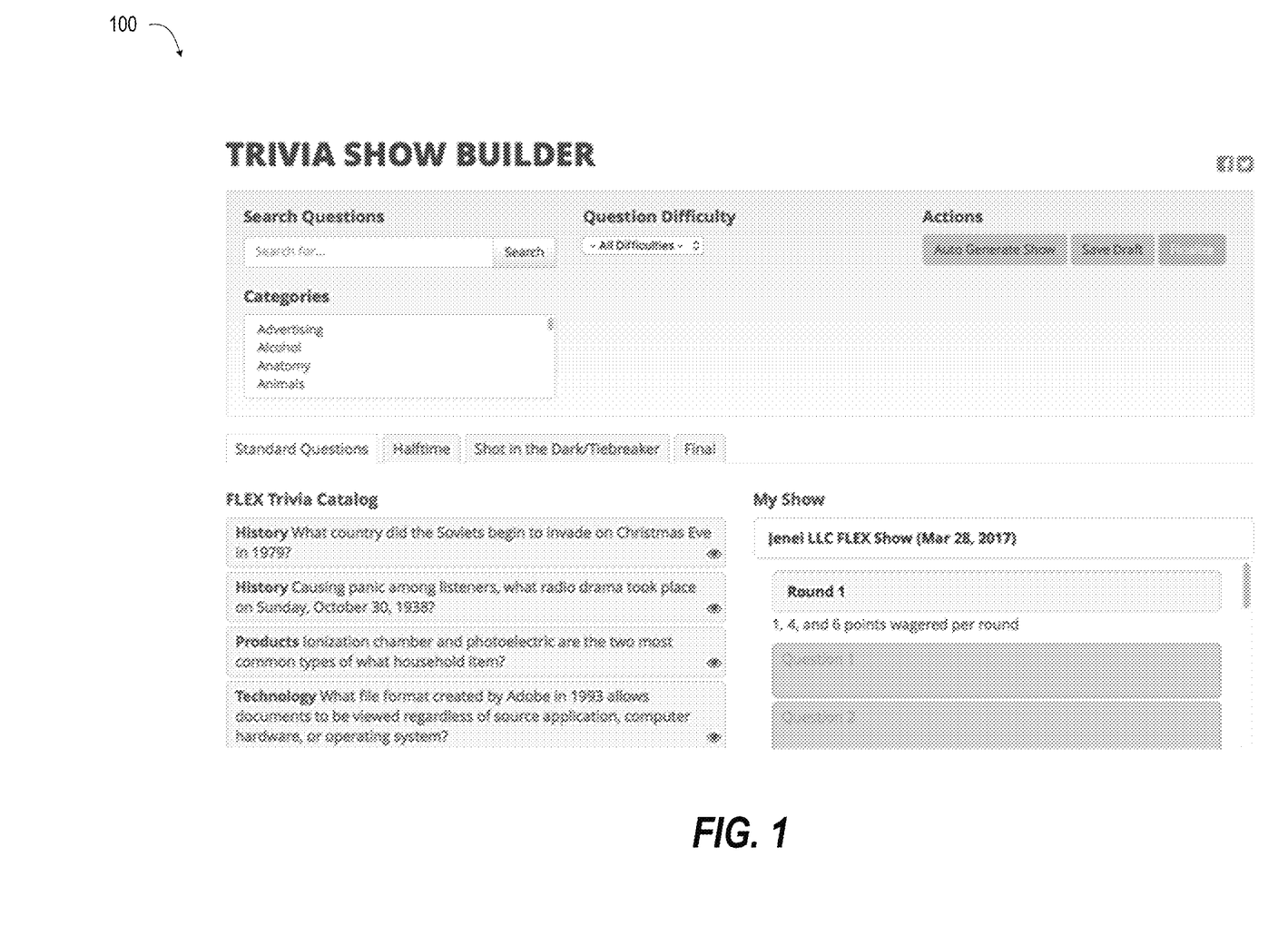
FIG. 1 illustrates an exemplary screenshot of a user interface while constructing a trivia game, according to one or more embodiments.
Figure 2:
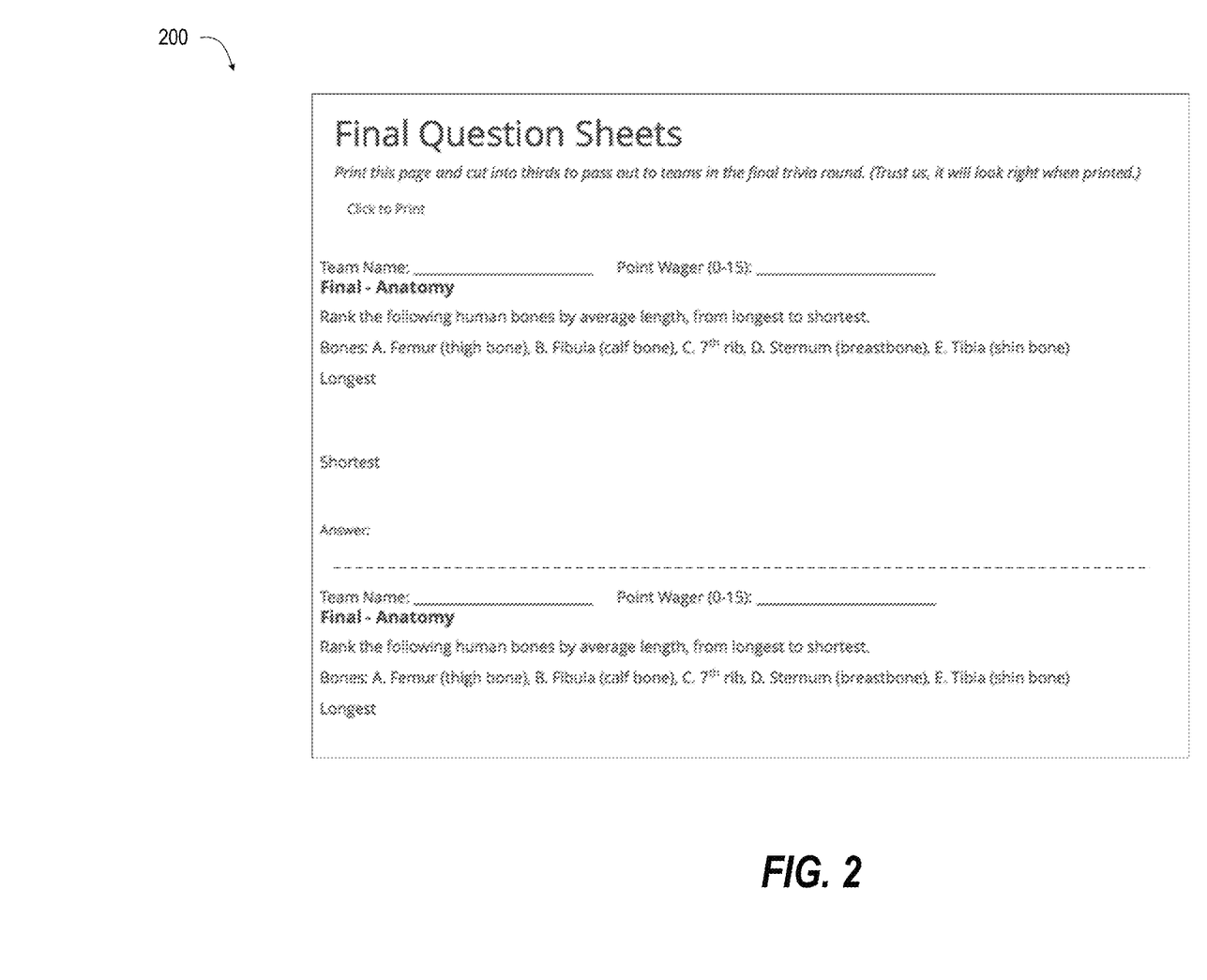
FIG. 2 illustrates an exemplary printout of a final questions sheet of a scalable system design, according to one or more embodiments.

FIG. 1 illustrates an exemplary screenshot 100 of a user interface while constructing a trivia game, according to one or more embodiments. FIG. 2 illustrates an exemplary printout 200 of a final questions sheet of a scalable system design, according to one or more embodiments.

Figure 3:
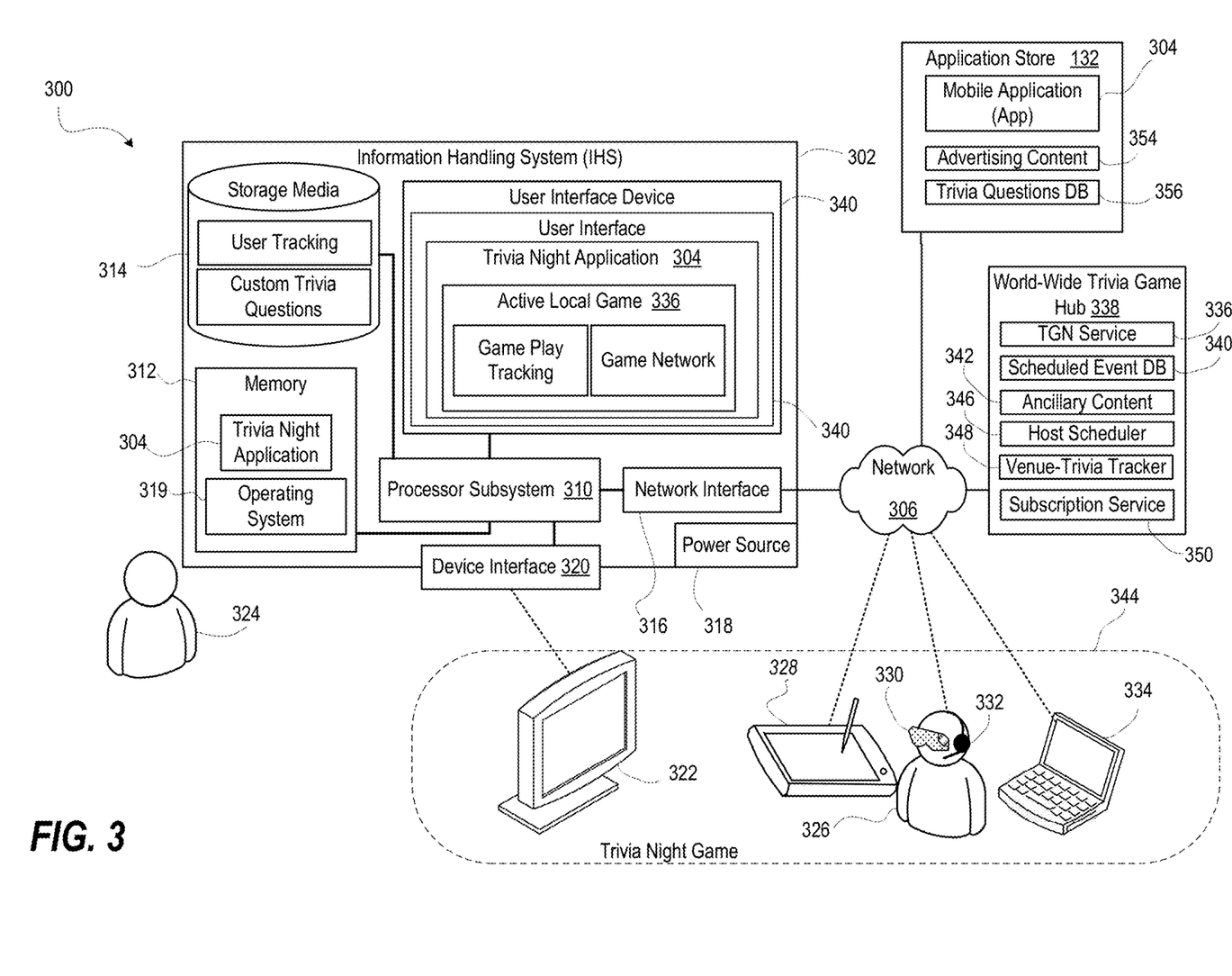
FIG. 3 illustrates a block diagram of a distributed communication system for implementing networked trivia game construction and execution, according to one or more embodiments.

FIG. 3 illustrates a communication system 300 including an information handling system (IHS) 302 for executing an application 304 for constructing and executing a trivia night game at least in part over a network 306. In an exemplary embodiment, the system 300 is for building a trivia game online using the networked builder and downloading the results in a fixed form, such as in portable document format (PDF). The PDFs are then used to host a trivia game. The players of the trivia game never utilize the game-building system of the invention. In an exemplary embodiment, there is no direct connection between the trivia game players (participant users) and the builder system. Host users/Clients use the show builder to build a game and then use the game at the host user's locale to host a game with their patrons. In an exemplary embodiment, the system is used to host games but to create downloadable games online. In one or more embodiments, the system does not make use of any mobile devices so that is not a required element. In one or more embodiments, the client/host user logs in from their networked device to the system to run the trivia game builder and create a game. The host user may download the results as a pdf to a handheld device for reading.

For purposes of this disclosure, an information handling system, such as IHS 302, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In a particular embodiment, the IHS 302 includes a processor subsystem ("processor") 310, a memory 312 communicatively coupled to processor subsystem 310, storage media 314, a network interface 316 communicatively coupled to processor subsystem 310, and a power source 318 electrically coupled to processor subsystem 310. Processor subsystem 310 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data such as an operating system 319. In some embodiments, processor 310 may interpret and/or execute program instructions and/or process data stored in memory 312 and/or another component of IHS 302. Memory 312 may be communicatively coupled to processor 31*o* and may include any system, device, or apparatus configured to retain program instructions and/or data for a period of time (e.g., computer-readable media). By way of example without limitation, memory 312 may include RAM, EEPROM, a PCMCIA card, flash memory, magnetic storage, opto-magnetic storage, or any suitable selection and/or array of volatile or non-volatile memory that retains data after power to IHS 302 is turned off or power to IHS 302 is removed. Network interface 316 may include any suitable system, apparatus, or device operable to serve as an interface between IHS 302 and network 306. Network interface 316 may enable the IHS 302 to communicate over network 306 using any suitable transmission protocol and/or standard, including without limitation all transmission protocols and/ or standards enumerated herein with respect to the discussion of network 306. A device interface 32*o* can link to other peripheral devices or systems useful in implementing a trivia night game, such as one or more monitors 322, that assist a host user 324 in presenting the trivia questions and scoring to other participant users 326. In one or more embodiments, one or more of the participant users 326 may interact with the host user 324 either in the same venue or remotely from their own user electronic devices, depicted as a tablet or smartphone device 328, augmented or virtual reality goggles 330, headphones 332 and personal computing workstation 334. Each can perform some or all of the processing as an IHS. The IHS 302 can connect to the user electronic devices 328, 330, 332 via network 306 or form an ad hoc, peer-to-peer network. In an exemplary embodiment, the client pays for the service, logs in, builds a game, downloads the game, and uses the game at their establishment for game user participants (e.g., restraint or bar patrons). In one exemplary embodiment, the systems here will not present anything directly to the game participants. The host user 324 connects to the networked game builder and receives the trivia game output. The host user 324 then interacts with participant users 326 to proceed with a trivia game.

In an exemplary embodiment, a trivia game night (TGN) service 336 is hosted on a world-wide trivia game hub 338. The TGN service 336 can have a scheduled event database (DB) 340 that can be used to advertise upcoming events. Ancillary content 342 can be provided to individual TGN events 344, such as visual advertisements or audio musical accompaniment. The TGN hub 338 can facilitate a host scheduler 346 for hiring a host for a trivia night game to chair a TGN event 344. A venue-trivia tracker 348 can assist during construction of a TGN event 344 by preventing reuse of a trivia question recently presented at the same venue. A subscription service 350 can provide monetized services for constructing and executing a TNG event 344.

Host users 324 or participant user 326 can provision their IHS 302 via an application store 352 by downloading a mobile app 304, advertising content 354 or a sample trivia question database 356.

Figure 4:
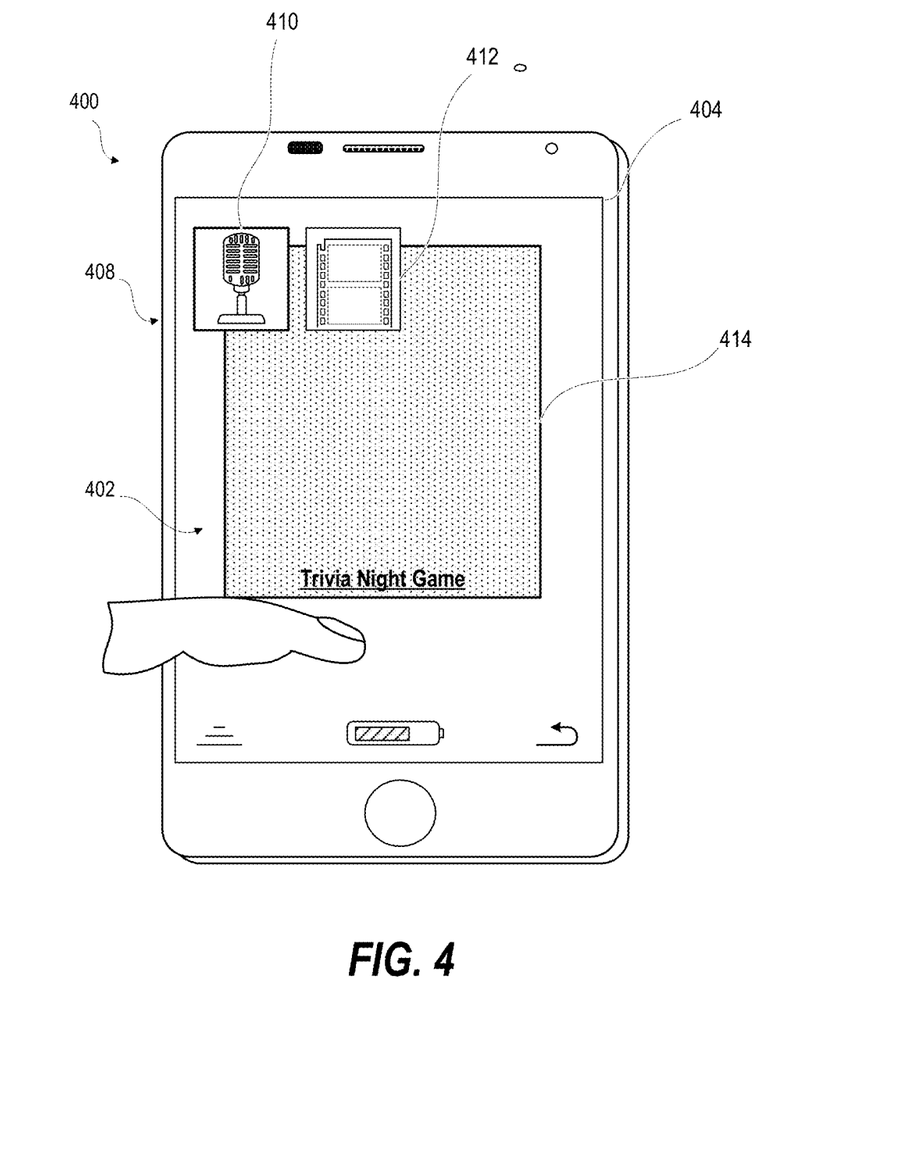
FIG. 4 illustrates a front view of a host device presenting a user interface of the networked trivia game construction and execution application, according to one or more embodiments.

FIG. 4 illustrates an illustrative electronic device 400 having a user interface device 402 that includes a visual display 404 and a speaker 406. Affordances 408 can be presented such as visually or aurally to solicit user inputs. For example, a music icon 410 can activate streaming audio content. A TGN icon 412 can launch the mobile application 414.

Figure 5:
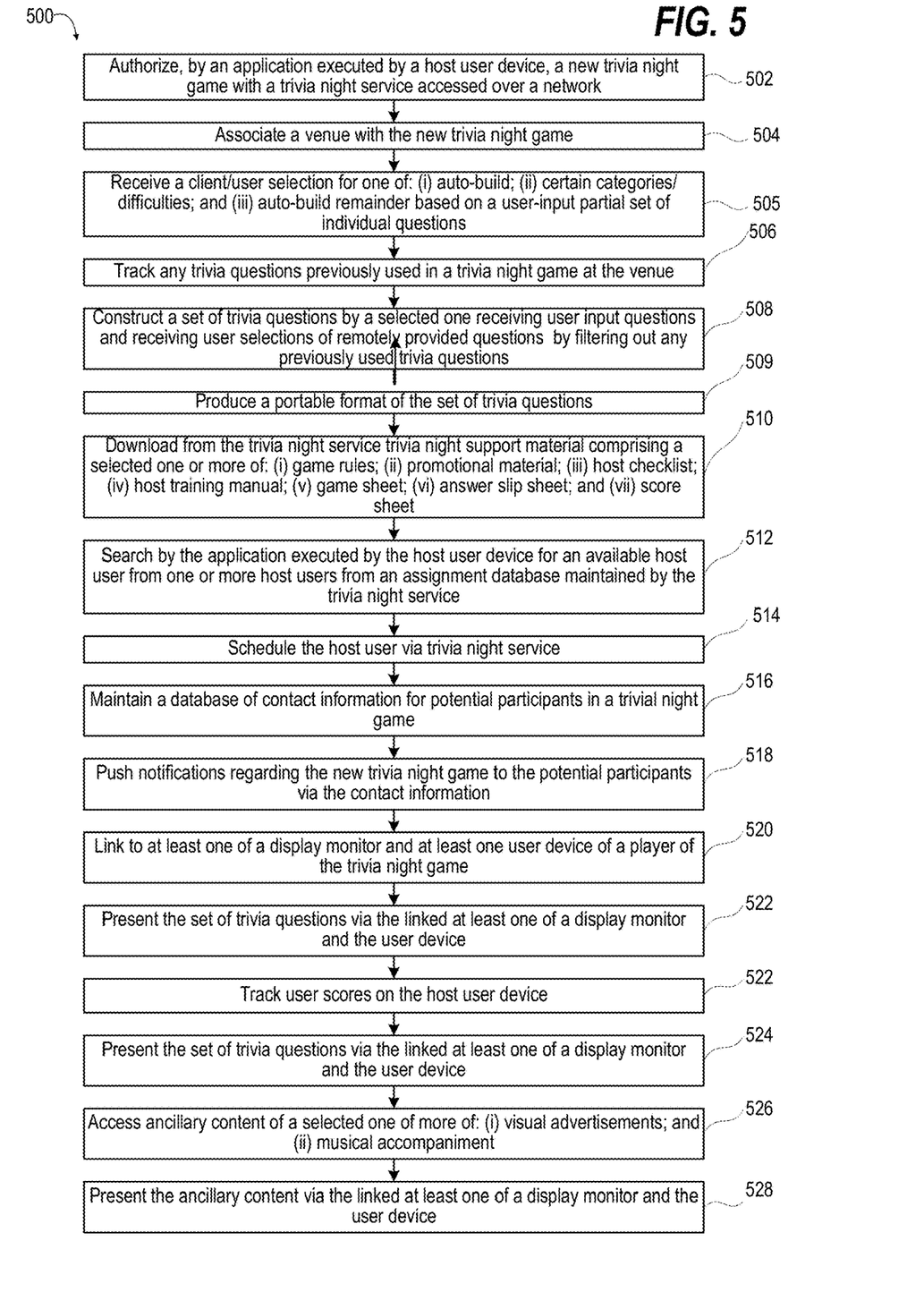
FIG. 5 illustrates a flow diagram of a method of constructing and implementing a network trivia game, according to one or more embodiments.

FIG. 5 illustrates a method 500 for constructing and implementing a trivia night game. In one or more embodiments, method 500 begins authorizing, by an application executed by a host user device, a new trivia night game with a trivia night service accessed over a network (block 502). Method 500 includes associating a venue with the new trivia night game (block 504). In one exemplary embodiment, the method 500 includes receiving a client/host user selection for one of: (i) auto-build; (ii) certain categories/difficulties; and (iii) auto-build remainder based on a user-input partial set of individual questions (block 505). Method 500 includes tracking any trivia questions previously used in a trivia night game at the venue (block 506). Method 500 includes constructing a set of trivia questions by a selected one receiving user input questions and receiving user selections of remotely provided questions by filtering out any previously used trivia questions (block 508). In another exemplary embodiment, the method 500 includes producing the set of trivia questions in a portable form (block 509). Method 500 includes downloading from the trivia night service trivia night support material comprising a selected one or more of: (i) game rules; (ii) promotional material; (iii) host checklist; (iv) host training manual; (v) game sheet; (vi) answer slip sheet; and (vii) score sheet (block 510). Method 500 includes searching by the application executed by the host user device for an available host user from one or more host users from an assignment database maintained by the trivia night service (block 512). Method 500 includes scheduling the host user via trivia night service (block 514). Method 500 includes maintain a database of contact information for potential participants in a trivial night game (block 516). Method 500 includes pushing notifications regarding the new trivia night game to the potential participants via the contact information (block 518). Method 500 includes linking to at least one of a display monitor and at least one user device of a player of the trivia night game (block 520). Method 500 includes presenting the set of trivia questions via the linked at least one of a display monitor and the user device (block 522). Method 500 includes tracking user scores on the host user device (block 524). Method 500 includes accessing ancillary content of a selected one of more of: (i) visual advertisements; and (ii) musical accompaniment (block 526). Method 500 includes presenting the ancillary content via the linked at least one of a display monitor and the user device (block 528). Then method 500 ends.

Figure 6:
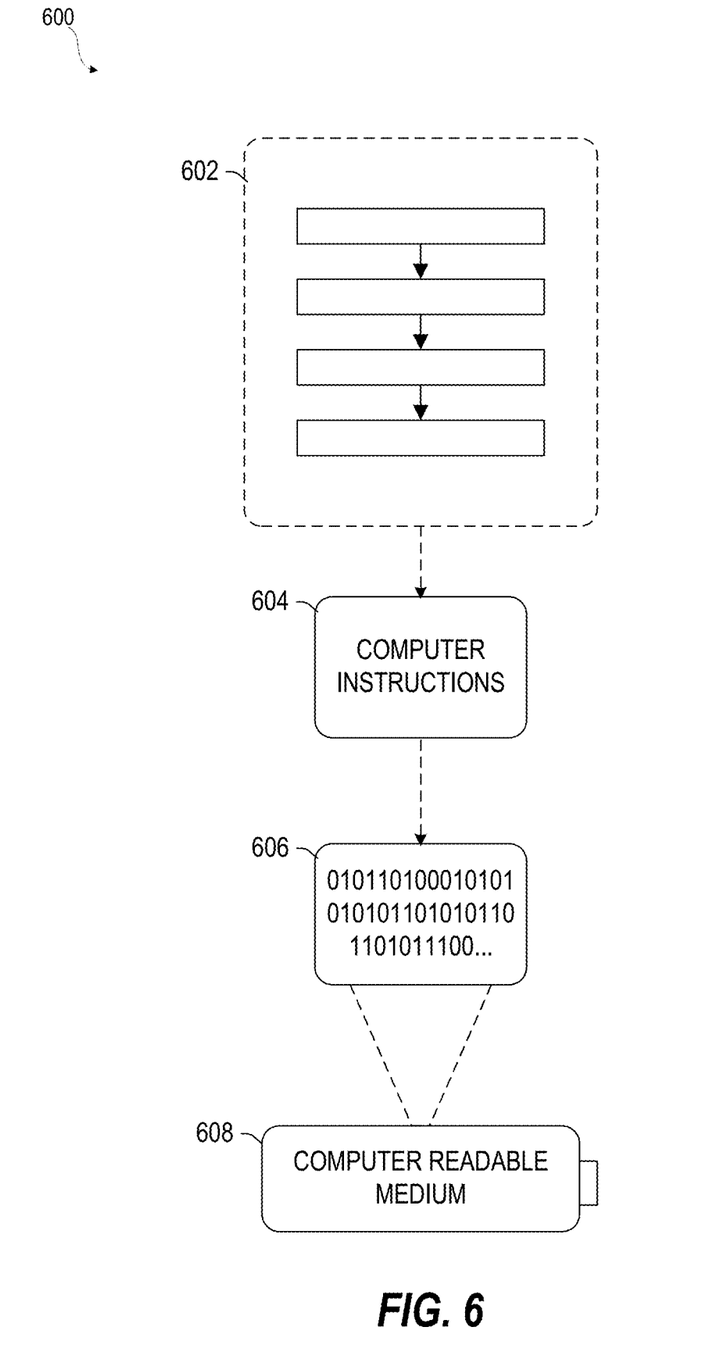
FIG. 6 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method 602, such as method 500 of FIG. 5. In another embodiment, the processor-executable instructions 604 may be configured to implement a system, such as the system 300 of FIG. 3. Many such computer-readable media may be devised by those of ordinary skill in the art that are configured to operate in accordance with the techniques presented herein.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the trivia show building environment described herein.

Accordingly, the presently described system may comprise a plurality of various hardware and/or software components such as those described below. It will be appreciated that for ease of description, the variously described hardware and software components are described and named according to various functions that it is contemplated may be performed by one or more software or hardware components within the system. However, it will be understood that the system may incorporate any number of programs configured to perform any number of functions including, but in no way limited to those described below. Furthermore, it should be understood that while, for ease of description, multiple programs and multiple databases are described, the various functions and/or databases may, in fact, be part of a single program or multiple programs running in one or more locations.

In an exemplary system within a computing environment for implementing the invention includes a general purpose computing device in the form of a computing system, commercially available from Intel, IBM, AMD, Motorola, Cyrix and others. Components of the computing system may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. Computing system typically includes a variety of computer readable media. Computer readable media can be any available media that can be accessed by the computing system and includes both volatile and nonvolatile media, and removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system. The system memory includes computer storage media in the form of volatile and/or nonvolatile memory such as read only memory (ROM) and random access memory (RAM). A basic input/output system (BIOS), containing the basic routines that help to transfer information between elements within computing system, such as during start-up, is typically stored in ROM. RAM typically contains data and/or program modules that are immediately accessible to and/or presently being operated on by processing unit. By way of example, and not limitation, an operating system, application programs, other program modules and program data are shown.

Computing system may also include other removable/non-removable, volatile/nonvolatile computer storage media. By way of example only, a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface such as interface, and magnetic disk drive and optical disk drive are typically connected to the system bus by a removable memory interface, such as interface.

The drives and their associated computer storage media, discussed above, provide storage of computer readable instructions, data structures, program modules and other data for the computing system. For example, hard disk drive is illustrated as storing operating system, application programs, other program modules and program data. Note that these components can either be the same as or different from operating system, application programs, other program modules, and program data. Operating system, application programs, other program modules, and program data are given different numbers hereto illustrates that, at a minimum, they are different copies.

A host user may enter commands and information into the computing system through input devices such as a tablet, or electronic digitizer, a microphone, a keyboard, and pointing device, commonly referred to as a mouse, trackball, or touch pad. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing system is incorporated, such as in a tablet-type personal computer. In addition, computers such as the computing system may also include other peripheral output devices such as speakers and printer, which may be connected through an output peripheral interface or the like.

Computing system may operate in a networked environment using logical connections to one or more remote computers, such as a remote computing system. The remote computing system may be a personal computer, a server, a router, a network PC, a peer device or other common network node, and typically includes many or all of the elements described above relative to the computing system, although only a memory storage device has been illustrated. The logical connections depicted include a local area network (LAN) connecting through network interface and a wide area network (WAN) connecting via modem, but may also include other networks. Such networking environments are commonplace in offices, enterprise-wide computer networks, intranets and the Internet.

For example, in the present embodiment, the computer system may comprise the source machine from which data is being migrated, and the remote computing system may comprise the destination machine. Note however that source and destination machines need not be connected by a network or any other means, but instead, data may be migrated via any media capable of being written by the source platform and read by the destination platform or platforms.

The central processor operating pursuant to operating system software such as IBM OS/2, Linux, UNIX, Microsoft Windows, Apple Mac OSX and other commercially available operating systems provides functionality for the services provided by the present invention. The operating system or systems may reside at a central location or distributed locations (i.e., mirrored or standalone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an ASIC. The bus may be an optical or conventional bus operating pursuant to various protocols that are well known in the art.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method of constructing and implementing a trivia night game, the method comprising:
   authorizing, via a trivia night service accessed over a network, by an application executed by a host user device, a new trivia night game associated with a venue at a geographical locale;
   constructing a set of trivia questions by a selected one of: (i) receiving user input questions; and (ii) receiving user selections of remotely provided questions;
   producing a portable format of the set of trivia questions that is downloaded to the host user device that is used by a host;
   linking the host user device to at least one of: (i) a display monitor; and (ii) at least one user device of a player of the curated live trivia night game within the geographic locale of the venue;
   presenting, by the host user device, the set of curated trivia questions via the linked at least one of: (i) the display monitor; and (ii) the at least one user device; and
   tracking user scores on the host user device by the host that interacts with participants present at the venue to receive an answer of the curated live trivia questions.

2. The method of claim 1, further comprising:
   linking to two or more display monitors at the venue of the trivia night game; and
   presenting the set of trivia questions via the linked two or more display monitors.

3. The method of claim 2, further comprising downloading from the trivia night service trivia night support material comprising a selected one or more of: (i) game rules; (ii) promotional material; (iii) host checklist; (iv) host training manual; (v) game sheet; (vi) answer slip sheet; and (vii) score sheet.

4. The method of claim 2, further comprising:
   associating the venue of more than one venue with the new trivia night game;
   tracking any trivia questions previously used in a trivia night game at the venue; and
   constructing the set of trivia questions by filtering out any previously used trivia questions.

5. The method of claim 2, further comprising:
   maintaining a database of contact information for potential participants in a trivial night game; and
   pushing notifications regarding the new trivia night game to the potential participants via the contact information.

6. The method of claim 2, further comprising:
   searching by the application executed by the host user device for an available host user from one or more host users from an assignment database maintained by the trivia night service; and
   scheduling the host user via trivia night service to host a live on-site trivia game.

7. The method of claim 2, further comprising:
   accessing ancillary content of a selected one of more of: (i) visual advertisements; and (ii) musical accompaniment; and presenting the ancillary content via the linked at least one of a display monitor and the user device.

8. A system comprising:

a trivia night service that contains network repository of trivia questions;

a network in communication with the trivia night service; and a host user device, the host user device comprising:

a network interface that communicates with the trivia night service via the network;

a user interface device; and a processor subsystem in communication with the interface and the user interface device, and which executes a trivia night application that:

authorizes, via a trivia night service accessed over a network, a new trivia night game associated with a venue at a geographical locale;

constructs a set of trivia questions by a selected one of: (i) receiving user input questions; and (ii) receiving user selections of remotely provided questions;

produces a portable format of the set of trivia questions that is downloaded to the host user device that is used by a host;

links the host user device to at least one of: (i) a display monitor; and (ii) at least one user device of a player of the curated live trivia night game within the geographic locale of the venue;

presents, by the host user device, the set of curated trivia questions via the linked at least one of: (i) the display monitor; and (ii) the at least one user device; and         tracks user scores on the host user device by the host that interacts with participants present at the venue to receive an answer of the curated live trivia questions.

9. The system of claim 8, further comprising:

links to two or more display monitors at the venue of the trivia night game; and presents the set of trivia questions via the linked two or more display monitors.

10. The system of claim 9, wherein the trivia night application causes the electronic device to download from the trivia night service trivia night support material comprising a selected one or more of: (i) game rules; (ii) promotional material; (iii) host checklist; (iv) host training manual; (v) game sheet; (vi) answer slip sheet; and (vii) score sheet.

11. The system of claim 9, wherein the trivia night application causes the electronic device to:

associate the venue of more than one venue with the new trivia night game;

track any trivia questions previously used in a trivia night game at the venue; and construct the set of trivia questions by filtering out any previously used trivia questions.

12. The system of claim 9, wherein the trivia night application causes the electronic device to:

maintain a database of contact information for potential participants in a trivial night game; and push notifications regarding the new trivia night game to the potential participants via the contact information.

13. The system of claim 9, wherein the trivia night application causes the electronic device to:

search for an available host user from one or more host users from an assignment database maintained by the trivia night service; and schedule the host user via trivia night service to host a live on-site trivia game.

14. The system of claim 9, wherein the trivia night application causes the electronic device to:

access ancillary content of a selected one of more of: (i) visual advertisements; and (ii) musical accompaniment; and present the ancillary content via the linked at least one of a display monitor and the user device.

15. A non-transitory computer-readable storage medium comprising computer-executable instructions, which when executed via a processing unit on a computer performs acts, comprising:

authorizing, via a trivia night service accessed over a network, by an application executed by a host user device, a new trivia night game associated with a venue at a geographical locale;

constructing a set of trivia questions by a selected one of: (i) receiving user input questions; and (ii) receiving user selections of remotely provided questions;

producing a portable format of the set of trivia questions that is downloaded to the host user device that is used by a host;

linking the host user device to at least one of: (i) a display monitor; and (ii) at least one user device of a player of the curated live trivia night game within the geographic locale of the venue;

presenting, by the host user device, the set of curated trivia questions via the linked at least one of: (i) the display monitor; and (ii) the at least one user device; and tracking user scores on the host user device by the host that interacts with participants present at the venue to receive an answer of the curated live trivia questions.

16. The computer-readable storage medium of claim 15, further comprising:

linking to two or more display monitors at the venue of the trivia night game; and presenting the set of trivia questions via the linked two or more display monitors.

17. The computer-readable storage medium of claim 16, wherein the computer-executable instructions, which when executed via the processing unit on the computer performs acts, further comprising: downloading from the trivia night service trivia night support material comprising a selected one or more of: (i) game rules; (ii) promotional material; (iii) host checklist; (iv) host training manual; (v) game sheet; (vi) answer slip sheet; and (vii) score sheet.

18. The computer-readable storage medium of claim 16, wherein the computer-executable instructions, which when executed via the processing unit on the computer performs acts, further comprising:

associating the venue of more than one venue with the new trivia night game;

tracking any trivia questions previously used in a trivia night game at the venue; and constructing the set of trivia questions by filtering out any previously used trivia questions.

19. The computer-readable storage medium of claim 16, wherein the computer-executable instructions, which when executed via the processing unit on the computer performs acts, further comprising:

maintaining a database of contact information for potential participants in a trivial night game; and pushing notifications regarding the new trivia night game to the potential participants via the contact information.

20. The computer-readable storage medium of claim 16, wherein the computer-executable instructions, which when executed via the processing unit on the computer performs acts, further comprising:
    searching by the application executed by the host user device for an available host user from one or more host users from an assignment database maintained by the trivia night service; and
    scheduling the host user via trivia night service to host a live on-site trivia game.

21. The computer-readable storage medium of claim 16, wherein the computer-executable instructions, which when executed via the processing unit on the computer performs acts, further comprising:
    accessing ancillary content of a selected one of more of: (i) visual advertisements; and (ii) musical accompaniment; and
    presenting the ancillary content via the linked at least one of a display monitor and the user device.

\* \* \* \* \*